(12) United States Patent
Konno et al.

(10) Patent No.: US 8,747,263 B2
(45) Date of Patent: Jun. 10, 2014

(54) TRANSMISSION GUIDE

(75) Inventors: Masahiko Konno, Osaka (JP); Kaori Mori, Osaka (JP); Yuji Kurematsu, Osaka (JP)

(73) Assignee: Tsubakimoto Chain Co, Osaka (JP)

( * ) Notice: Subject to any disclaimer, the term of this patent is extended or adjusted under 35 U.S.C. 154(b) by 0 days.

(21) Appl. No.: 13/600,994

(22) Filed: Aug. 31, 2012

(65) Prior Publication Data

US 2013/0059688 A1    Mar. 7, 2013

(30) Foreign Application Priority Data

Sep. 7, 2011  (JP) ................................. 2011-195339

(51) Int. Cl.
    *F16H 7/08*    (2006.01)

(52) U.S. Cl.
    USPC .......................................... 474/111; 474/140

(58) Field of Classification Search
    USPC .................................. 474/111, 140
    See application file for complete search history.

(56) References Cited

U.S. PATENT DOCUMENTS

| | | | | |
|---|---|---|---|---|
| 4,826,468 | A * | 5/1989 | Friedrichs | 474/101 |
| 4,832,664 | A * | 5/1989 | Groger et al. | 474/111 |
| 5,045,032 | A * | 9/1991 | Suzuki et al. | 474/140 |
| 5,222,917 | A * | 6/1993 | Shimaya et al. | 474/101 |
| 5,318,482 | A * | 6/1994 | Sato et al. | 474/111 |
| 5,813,935 | A * | 9/1998 | Dembosky et al. | 474/111 |
| 5,820,502 | A * | 10/1998 | Schulze | 474/140 |
| 5,853,341 | A * | 12/1998 | Wigsten | 474/140 |
| 5,984,815 | A * | 11/1999 | Baddaria | 474/111 |
| 6,013,000 | A * | 1/2000 | Moretz | 474/111 |
| 6,036,613 | A * | 3/2000 | Diehm | 474/111 |
| 6,302,816 | B1 * | 10/2001 | Wigsten | 474/111 |
| 6,412,464 | B1 * | 7/2002 | Schneider et al. | 123/90.31 |
| 6,601,473 | B2 * | 8/2003 | Suzuki | 74/579 R |
| 6,612,952 | B1 * | 9/2003 | Simpson et al. | 474/111 |
| 6,645,102 | B2 * | 11/2003 | Kumakura | 474/111 |
| 6,669,590 | B2 * | 12/2003 | Kawano et al. | 474/140 |
| 6,758,777 | B2 * | 7/2004 | Young | 474/140 |

(Continued)

FOREIGN PATENT DOCUMENTS

| | | |
|---|---|---|
| EP | 1338828 A2 | 8/2003 |
| JP | 2002234051 A | 8/2002 |

(Continued)

OTHER PUBLICATIONS

Unpublished U.S. Appl. No. 13/558,994 Transmission Guide.

(Continued)

*Primary Examiner* — William A Rivera
*Assistant Examiner* — Henry Liu
(74) *Attorney, Agent, or Firm* — Howson & Howson LLP

(57) ABSTRACT

A transmission guide comprises a synthetic resin shoe and a more rigid synthetic resin base, integrally molded by two-member molding. The base is formed with a pair of spaced, opposed, side walls extending in the direction of elongation of the base along opposite edges of a shoe-supporting surface of the base. These side walls engage respective side edges of the shoe, and extend past the front surface of the shoe so that they can restrict lateral movement of a transmission chain sliding along the front surface of the shoe. Indentations in the side walls receive protrusions formed on the edges of the shoe. Edges of the openings of the indentations are chamfered or convexly curved to avoid interference with the movement of the chain along the guide.

3 Claims, 14 Drawing Sheets

(56) References Cited

U.S. PATENT DOCUMENTS

| | | | |
|---|---|---|---|
| 6,796,917 B2 * | 9/2004 | Konno | 474/111 |
| 6,832,966 B2 * | 12/2004 | Kawano et al. | 474/111 |
| 6,843,742 B2 * | 1/2005 | Konno | 474/111 |
| 6,852,051 B2 * | 2/2005 | Konno | 474/111 |
| 6,884,192 B2 * | 4/2005 | Konno et al. | 474/111 |
| 6,889,642 B2 * | 5/2005 | Fink et al. | 123/90.31 |
| 6,902,505 B2 * | 6/2005 | Yonezawa et al. | 474/111 |
| 6,939,259 B2 * | 9/2005 | Thomas et al. | 474/111 |
| 6,955,621 B2 * | 10/2005 | Wigsten et al. | 474/110 |
| 6,969,331 B2 * | 11/2005 | Konno | 474/111 |
| 7,018,312 B2 * | 3/2006 | Sonobata | 474/111 |
| 7,074,145 B2 * | 7/2006 | Konno et al. | 474/111 |
| 7,163,479 B2 * | 1/2007 | Young | 474/140 |
| 7,476,169 B2 * | 1/2009 | Konno | 474/111 |
| 7,513,843 B2 * | 4/2009 | Markley et al. | 474/111 |
| 7,524,254 B2 * | 4/2009 | Konno | 474/111 |
| 7,691,018 B2 * | 4/2010 | Haesloop et al. | 474/111 |
| 7,951,029 B2 * | 5/2011 | Oota et al. | 474/111 |
| 7,967,708 B2 * | 6/2011 | Hayami et al. | 474/111 |
| 8,007,385 B2 * | 8/2011 | Hirayama et al. | 474/111 |
| 2002/0004433 A1 | 1/2002 | Fujiwara et al. | |
| 2005/0079938 A1 | 4/2005 | Hashimoto et al. | |
| 2006/0172835 A1 * | 8/2006 | Konno | 474/111 |
| 2009/0036242 A1 * | 2/2009 | Hayami et al. | 474/111 |
| 2009/0105023 A1 * | 4/2009 | Oota et al. | 474/111 |

FOREIGN PATENT DOCUMENTS

| | | |
|---|---|---|
| JP | 2004-150615 A | 5/2004 |
| JP | 2005-114126 A | 4/2005 |
| JP | 2007040331 A | 2/2007 |

OTHER PUBLICATIONS

Unpublished U.S. Appl. No. 13/597,383 Transmission Guide.

Search report of British Intellectual Property Office dated Dec. 19, 2012.

* cited by examiner

GUIDE WIDTH DIRECTION

CHAIN EXIT SIDE

CHAIN ENTRY SIDE

GUIDE WIDTH DIRECTION

GUIDE WIDTH DIRECTION

CHAIN EXIT SIDE

CHAIN ENTRY SIDE

GUIDE WIDTH DIRECTION

TRANSMISSION GUIDE

CROSS REFERENCE TO RELATED APPLICATIONS

This application claims priority on the basis of Japanese Patent Application 2011-195339, filed on Sep. 7, 2011 The disclosure of Japanese Patent Application No. 2011-195339 is herein incorporated by reference.

FIELD OF THE INVENTION

This invention relates to a transmission guide for use as a stationary guide for guiding a traveling transmission chain, or as a movable guide for applying tension to, and guiding, the chain. A transmission incorporating the guide described herein can be used in an automobile engine, for example, to transmit power by means of an endless roller chain or a silent chain engaged with a driving sprocket and one or more driven sprockets.

BACKGROUND OF THE INVENTION

FIGS. 21 and 22 show a conventional transmission guide 800 for use in the timing transmission of an automobile engine. The guide comprises a shoe 810 having a sliding contact surface 810a on which a transmission chain C slides, and a separately molded base 820 for supporting, and maintaining the configuration of, the shoe 810. The shoe 810 is formed with hooks 813, which can be provided on both sides of the shoe 810, and the base 820 is cut away to form hook-receiving notches 823. The shoe 810 and the base 820 are assembled by twisting the shoe, and engaging the hooks 813 with the notches 813, as described in United States Patent Application Publication No. 2005/0079938, dated Apr. 14, 2005.

In another known chain guide, disclosed in laid-open Japanese Patent Application No. 2004-150615, dated May 27, 2004, the back surface of a synthetic resin shoe is fused to the front surface of a base composed of another synthetic resin.

In the operation of the transmission guide 800 in FIGS. 21 and 22, if the side wall 811 of the shoe 810 is low, i.e., it does not extend far enough from the sliding-contact surface 810a, the transmission chain can straddle and ride over the side wall 811, and damage parts of the transmission.

If an external force is applied to the side wall 811 of a shoe 810 having a low rigidity compared to that of the base 820, the side wall 811 can bend inward in the direction of the width of the guide, and the edge of the side wall 811 may contact, and hamper the travel of, the transmission chain.

Furthermore, if the transmission chain vibrates due to load variations as it travels on the sliding contact surface, the shoe 810 can move longitudinally by an amount corresponding to the clearance allowed for installation of the hooks in the hook-receiving notches. Therefore, a hook 812 of the shoe 810 can locally abut a notch 823 of the base 820 causing an excessive concentration of stress which can cause breakage of the hook, a change in the relationship between the shoe and the base, and result in destabilization of the path of the transmission chain.

On the other hand, in the case of the chain guide of laid-open Japanese Patent Application No. 2004-150615, the strength of the fused connection between the shoe and the base cannot be maintained over a long time, and, when the transmission chain becomes located eccentrically in the direction of the width of the guide, and a shear force acts on the shoe in the direction of the width of the guide, the shoe can become detached from the base.

SUMMARY OF THE INVENTION

Accordingly, there is a need for a transmission guide that avoids straddling of a guide side wall by the transmission chain, avoids riding of the transmission chain over the side wall, prevents inward bending of the guide side wall, and enhances strength of the fused connection of the synthetic resin shoe to the synthetic resin base.

The transmission guide according to the invention comprises a synthetic resin shoe and a synthetic resin base for supporting the shoe. The shoe is elongated, and has a front surface on which a chain can slide, a back surface, and opposite side edges extending along its direction of elongation. The base is elongated along the direction of elongation of the shoe, and has a supporting surface engaged with the back surface of the shoe. The supporting surface has opposite edges extending along the direction of elongation of the base. The base has a higher rigidity than that of the shoe, and the shoe and base are integrally molded by two-member molding.

The base is formed with a pair of spaced, opposed, walls extending in the direction of elongation of the base. These walls can be side walls extending along the opposite edges of the supporting surface. The walls sandwich at least a part of the shoe, and, if they are side walls, they can engage the respective side edges of the shoe and extend past the front surface of the shoe so that they can restrict lateral movement of a transmission chain sliding along the front surface of the shoe.

Two-member molding of the guide, in which the synthetic resin shoe is integrally molded to a synthetic resin base having a greater rigidity, significantly simplifies the production of the guide by eliminating conventional assembly steps. In addition, the above-described structure has a number of additional advantages, including the following.

Sandwiching the shoe between side walls of the base on both sides of the shoe helps to prevent the chain from riding over side walls of the guide. Moreover the side walls of the base, by virtue of their greater rigidity compared to side walls formed as unitary components of a shoe, better maintain their upright posture even when subjected to external force exerted in the direction of the width of the guide. Therefore, it is possible to prevent the side walls from bending inward, and to ensure stable chain travel.

Furthermore, the fused area over which the synthetic resin shoe is joined with the synthetic resin base is increased as a result of the sandwiched configuration, so that the strength of the joint is increased. In addition, the side walls block widthwise movement of the shoe relative to the base so that, even when a shear force acts on the shoe in the direction of the width of the guide, the side walls resist widthwise shifting of the shoe. Accordingly, it is possible achieve a significant improvement in the strength of the joint between the shoe and the base, compared to the case of a conventional guide in which a back surface of a synthetic resin shoe is fused to a front supporting surface of a synthetic resin base.

In accordance with another aspect of the invention, a plurality of shoe-engaging concave indentations is formed in each of the two side wall surfaces that extend along the direction of elongation of the shoe. These indentations are disposed at intervals along the direction of elongation of the shoe, and the shoe has a plurality of protrusions on each of its side edges, and each of these protrusions extends into one of the indentations. The engagement of the protrusions of the shoe with the indentations in the side wall surfaces of the base, makes it possible to maintain the strength of the joint between the shoe and the base even when the shoe is subjected to a shear force acting in the direction of elongation of the guide.

In addition, lubricating oil, which is always present in the form of a mist in the enclosure of a timing drive, accumulates in the indentations in the side walls of the base, and flows from these indentations into the interface between the transmission chain and the sliding contact surface of the shoe, thereby maintaining good lubrication over a long time and prolonging the useful of the shoe by suppressing thermal deterioration and wear.

The parts of the side walls between the indentations serve as ribs that reinforce the guide wall, preventing it from bending inward, even if the indented parts of the guide wall are thin.

Each of the indentations has an opening through which a protrusion of the shoe extends. Each of these openings is defined by a pair of edges, spaced from each other in the direction of elongation of the shoe and extending substantially perpendicular to an adjacent part of the supporting surface of the base. In accordance with still another aspect of the invention, at least one of the edges of each of the pairs of edges is chamfered or convexly curved. That is, it has a shape from the group consisting of chamfers and convex curves, so that the opening of each indentation is tapered. Even if the transmission chain meanders in the widthwise direction and contacts a shoe-engaging indentation, resistance to movement of the chain due to contact between the transmission chain and the edge of the indentation is reduced by the chamfer or curvature, and accordingly, smooth travel of the transmission chain is maintained.

DETAILED DESCRIPTION OF THE PREFERRED EMBODIMENTS

Figure 1:
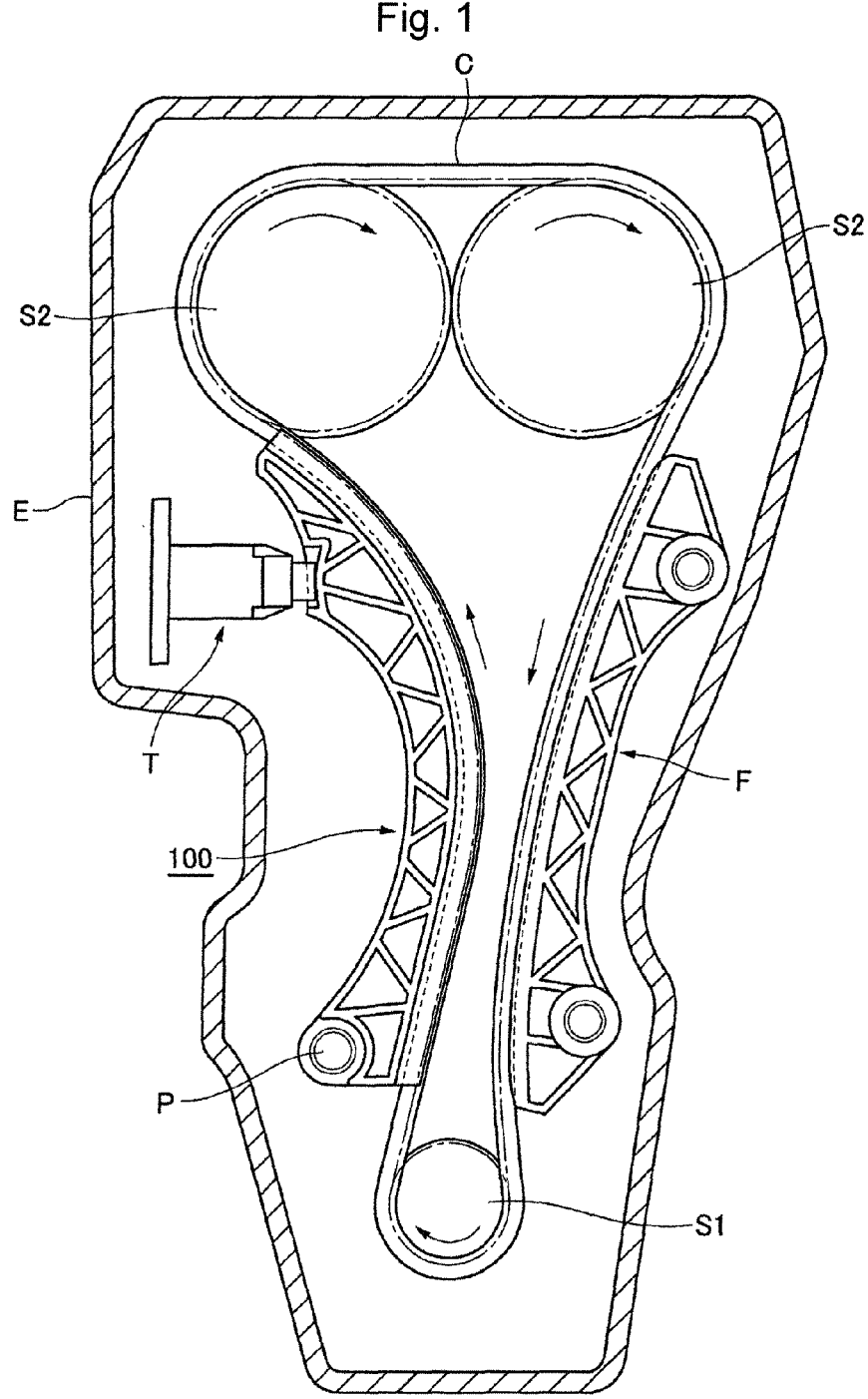
FIG. 1 is a schematic front elevational view of the timing drive of a DOHC (dual overhead cam) internal combustion engine, incorporating a transmission guide according to the invention.

As shown in FIG. 1, a transmission guide 100 is incorporated into the timing drive of a dual overhead cam (DOHC) internal combustion engine E, in which a transmission chain C is engaged with and driven by a crankshaft sprocket S1, and in driving relationship with a pair of camshaft sprockets S2. The chain C can be a roller chain. The guide 100 is a movable guide pivoted on a shoulder bolt P, and in sliding engagement with a span of the chain that travels from the crankshaft sprocket toward the camshaft sprockets.

A tensioner T exerts a force against the guide 100, urging the guide in a direction to maintain tension in the chain, preventing excessive looseness of the chain and at the same time avoiding excessive tension. A stationary guide F, fixed to the engine block, guides the span of the transmission chain that travels from the camshaft sprockets toward the crankshaft sprocket.

Figure 2:
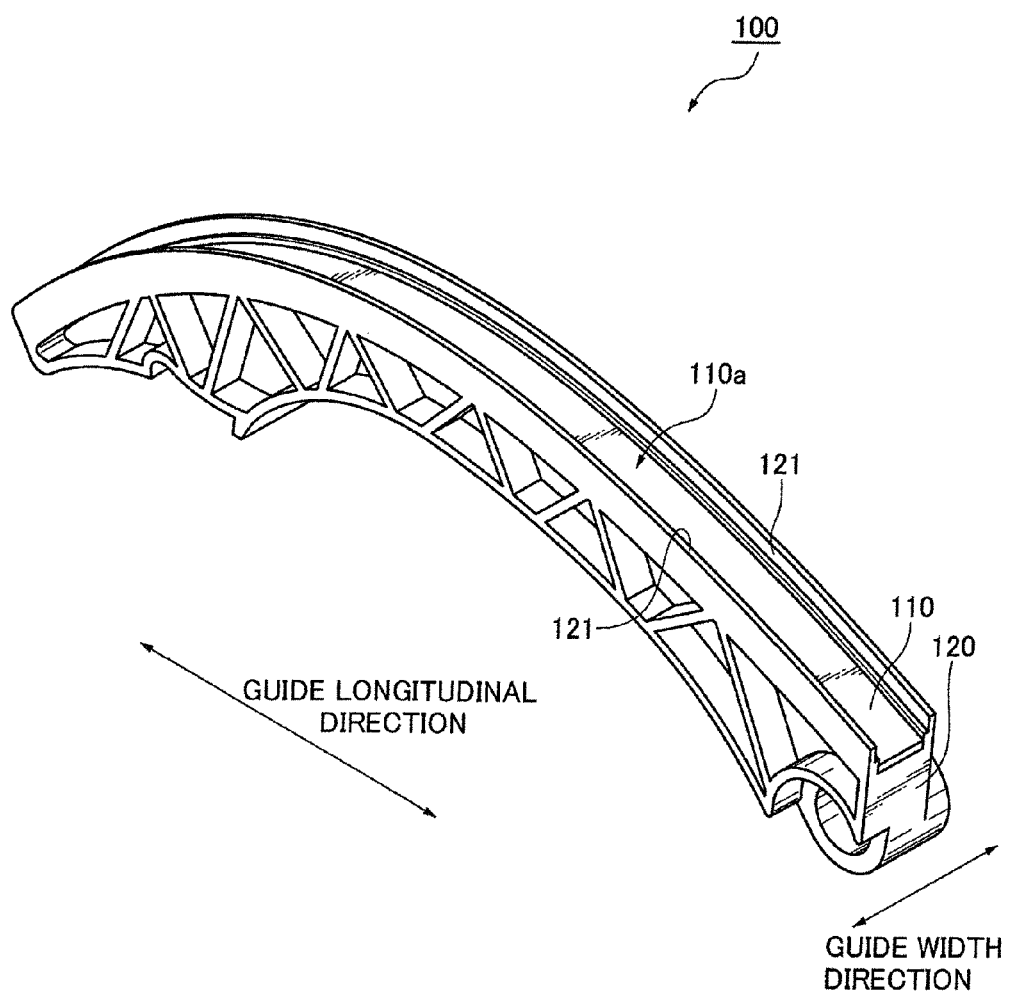
FIG. 2 is a perspective view of the transmission guide shown in FIG. 1.
Figure 3:
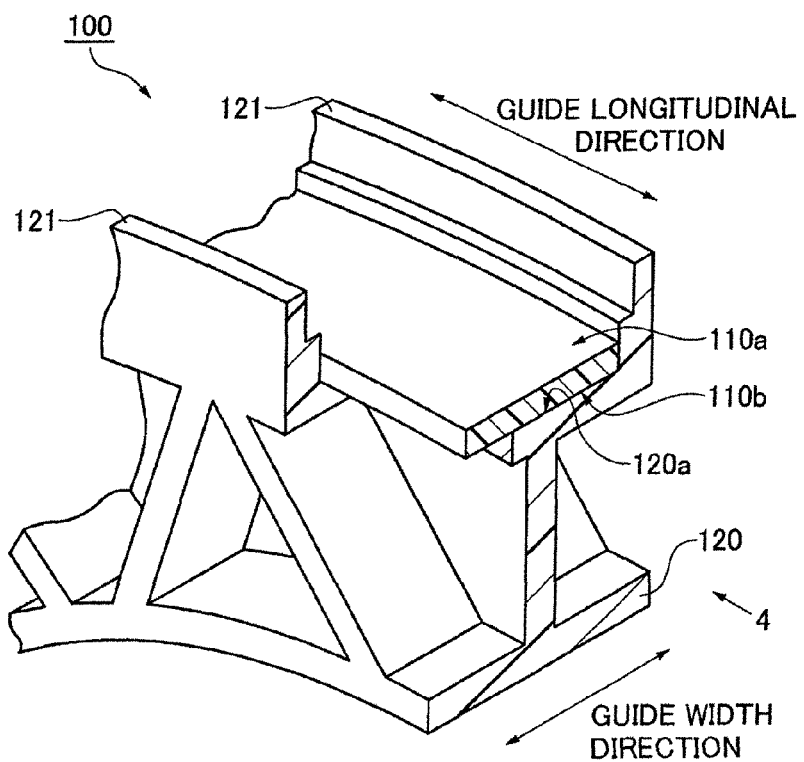
FIG. 3 is a fragmentary perspective view of the transmission guide of FIG. 2, partly in section.
Figure 4:
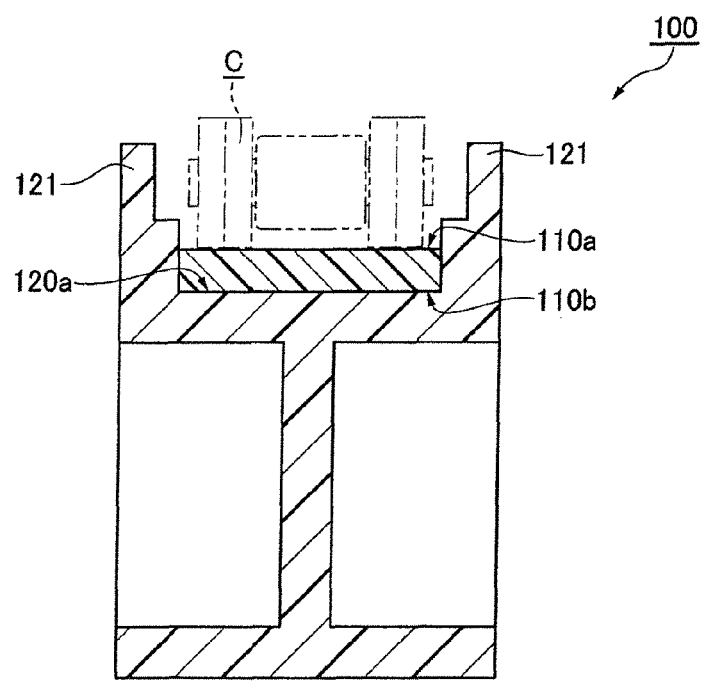
FIG. 4 is a cross-sectional view of the transmission guide of as seen along the direction of arrow 4 in FIG. 3.

As shown in FIGS. 2 through 4, a movable guide 100 comprises an elongated synthetic resin shoe 110 having a sliding contact surface 110a on which a transmission chain slides in the direction of elongation, and a synthetic resin base 120 having a supporting surface 120a for supporting the back surface 110b of the shoe 110. The base 120 is composed of a glass fiber-reinforced polyamide resin and has a rigidity greater than that of the shoe 110, which is composed of polyamide resin.

The synthetic resin shoe 110 is integrally molded with the synthetic resin base 120 by two-member molding. That is, the shoe 110 is formed by secondary injection molding after molding of the base 120 in a primary injection molding step. The shoe 110 is integrated with the base 120 in the molding process.

As shown in FIGS. 3 and 4, the base 120 is formed with a pair of parallel, longitudinally extending side walls 121 that sandwich the shoe on both sides.

With this arrangement, the area over which the shoe 110 is fused to the base 120 is increased so that the bond between the shoe and the base is much stronger than the bond in a conventional guide in which a back surface of a shoe having a straight transverse cross-section is fused to a front surface of a guide also having a straight transverse cross-section. Therefore, when a widthwise shear force acts on the shoe 110, both the strength of the bond, and the engagement of the walls 121 with grooves in the back surface of the shoe, resist the shear force and prevent dislocation of the shoe relative to the base. In addition, the height and rigidity of the side walls of the base helps to prevent an erroneous installation of the chain in which the chain crosses over one of the side walls.

Figure 5:
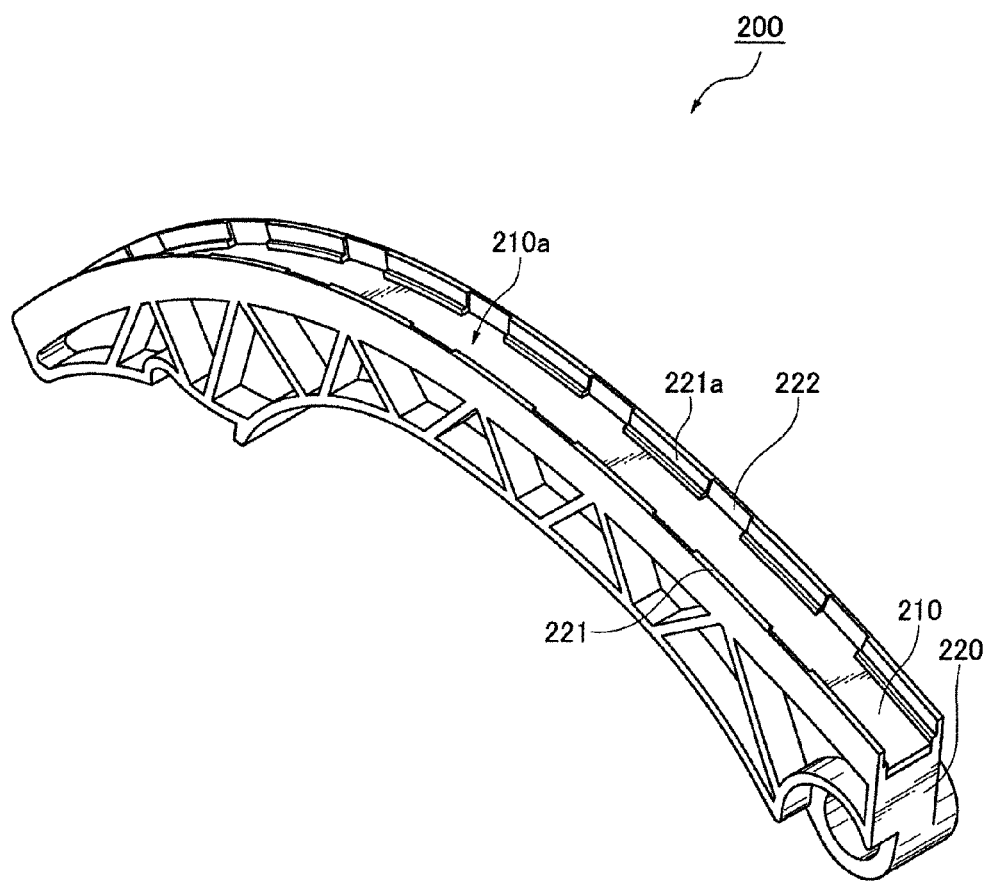
FIG. 5 is a fragmentary perspective view of a transmission guide according to a second embodiment of the invention.
Figure 6:
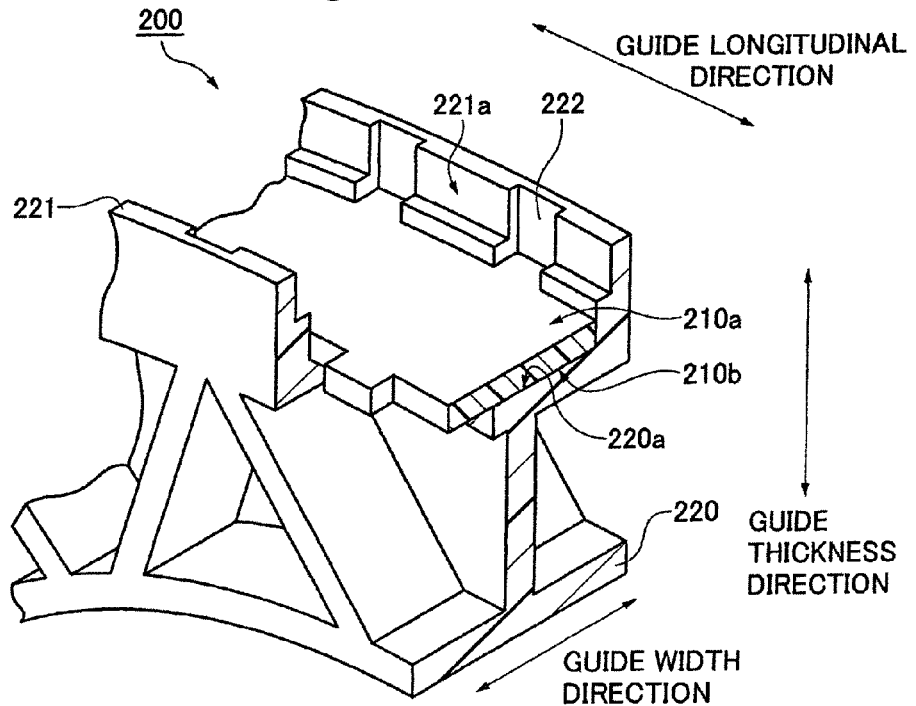
FIG. 6 is a fragmentary perspective view of the transmission guide of FIG. 5, partly in section.
Figure 7:
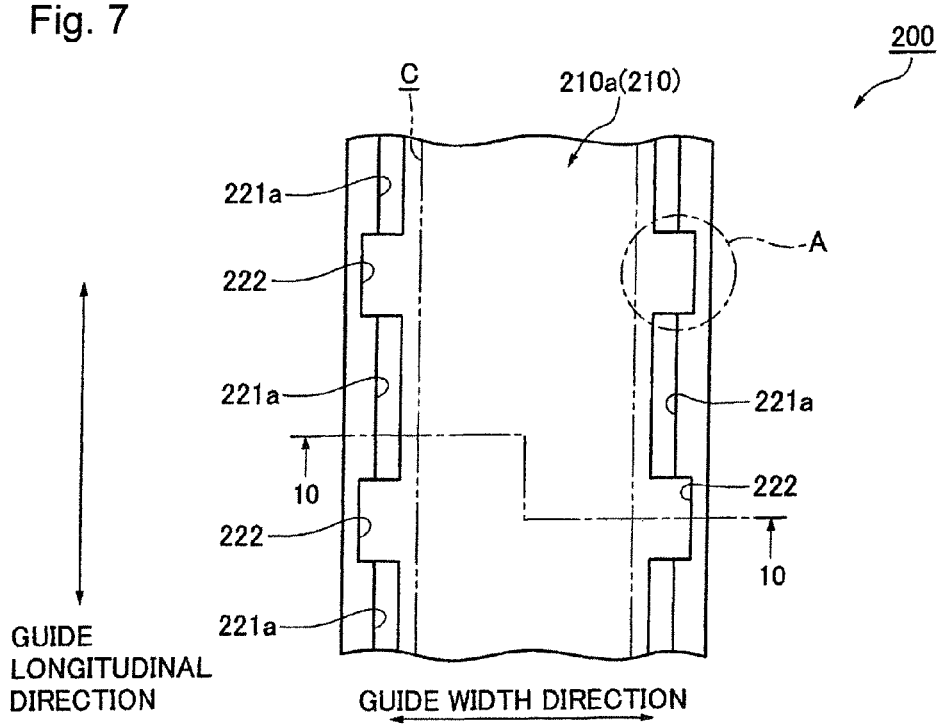
FIG. 7 is a plan view of a portion of the transmission guide of FIG. 5 as seen in the direction of the thickness of the shoe.

In the embodiment illustrated in FIGS. 5 through 7, a transmission guide 200 comprises an elongated synthetic resin shoe 210, having a surface 210a on which a transmission chain slides longitudinally, and a synthetic resin base 220, having a surface 220a for supporting the back surface 210b of the shoe 210. The base 220 is preferably composed of glass fiber-reinforced polyamide resin and has a rigidity greater than that of the synthetic resin shoe 210, which is preferably also composed of polyamide resin. The shoe 210 is integrally molded with the base 220 by two-member molding, in which the synthetic resin base 220, composed of glass fiber-reinforced polyamide resin, is first molded in a primary injection molding step, and the synthetic resin shoe 210, composed of polyamide resin, is molded in a secondary injection molding step. The synthetic resin shoe 210 is thus integrated with the synthetic resin base 220 in the molding process.

The base 220 is formed with a pair of laterally spaced, opposed, side walls 221 that respectively engage opposite edges of the shoe 210, thereby sandwiching the shoe from both sides. The side walls 221 extend beyond the shoe and can therefor restrict widthwise movement of a transmission chain as it slides longitudinally on the surface 210a of the shoe.

When a transmission chain is installed on the movable guide 200 the chain has to cross over a side wall 221. Even when the an external force is applied to a side wall 221 in the direction of the width of the guide, the side wall 221, because it is a part of the synthetic resin base 220 and his higher rigidity than that of the shoe, maintains its upright posture. Therefore, an erroneous condition of installation of the chain, in which the chain crosses over a side wall of the guide, is prevented. Furthermore, the area over which the shoe is fused to the base is increased by sandwiching the shoe 210 between the side walls 221 of the base. Therefore, when a shear force acts on the synthetic resin shoe 210 in the direction of the width of the guide, the side walls widthwise resist movement of the shoe.

As shown in FIGS. 5 through 7, each of the side walls 221 of the base has a surface 221a that extends along the longitudinal direction and a plurality of widthwise shoe-engaging indentations 222 formed in the surface 221a and disposed at intervals along the length of the base for receiving corresponding protrusions formed on the side edges of the shoe.

Figure 8:
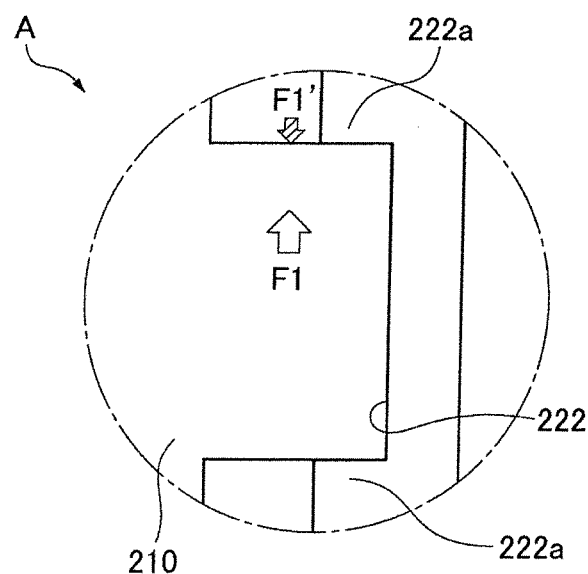
FIG. 8 is an enlarged schematic view of a portion of FIG. 7 within a broken line circle "A," illustrating a condition in which a shearing force is applied to the shoe of the transmission guide in the direction of chain travel.

With this arrangement, when a shear force F1 is applied to the shoe 210, the force F1 being directed in the direction of chain travel, i.e., toward the exit end of the guide as shown in FIG. 8, the force F1 is opposed by a set of reaction forces F1', applied to each of the protrusions by a surface of an indentation in the side walls into which the protrusion fits.

Figure 9:
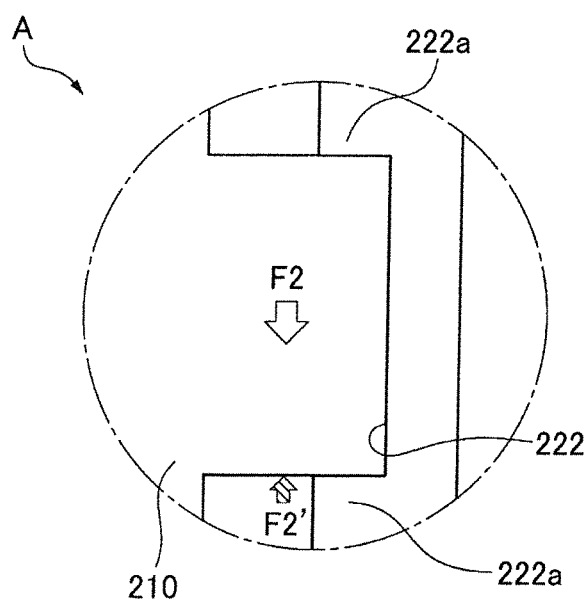
FIG. 9 is an enlarged schematic view of a portion of FIG. 7 within the broken line circle "A," illustrating a condition in which a shearing force is applied to the shoe of the transmission guide in a direction opposite to the direction of chain travel.

Similarly, when a shear force F2 is applied to the shoe 210, the force F2 being directed in a direction opposite to the direction of chain travel, i.e., toward the entry end of the guide as shown in FIG. 9, the force F2 is opposed by a set of reaction forces F2', applied to each of the protrusions by a surface of an indentation in the side wall into which the protrusion fits.

Figure 10A:
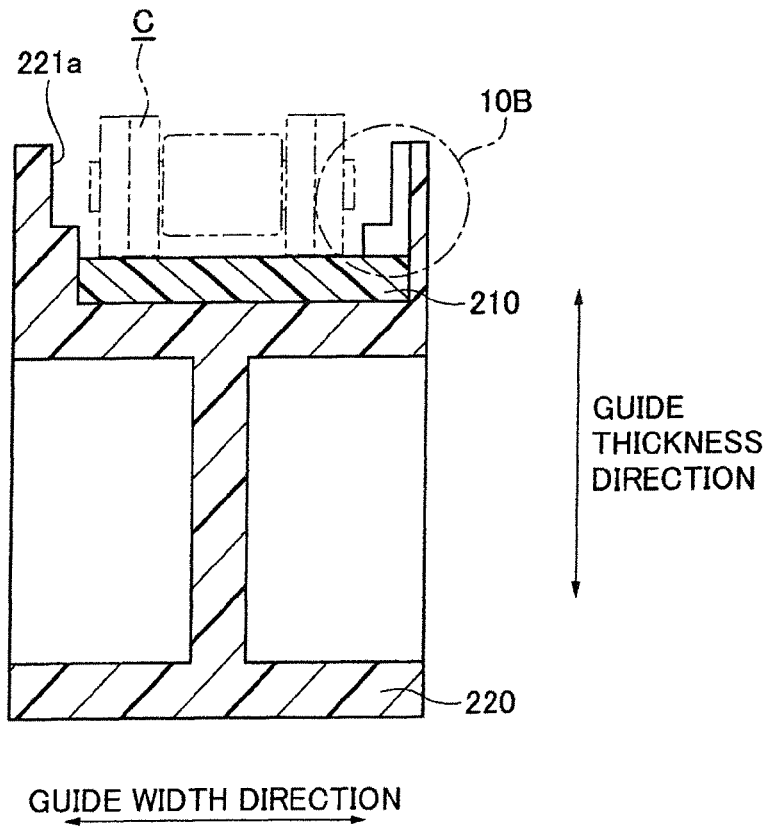
FIG. 10A is a sectional view of the guide shown in FIG. 7 taken on cross-section surface 10-10 in FIG. 7.
Figure 10B:
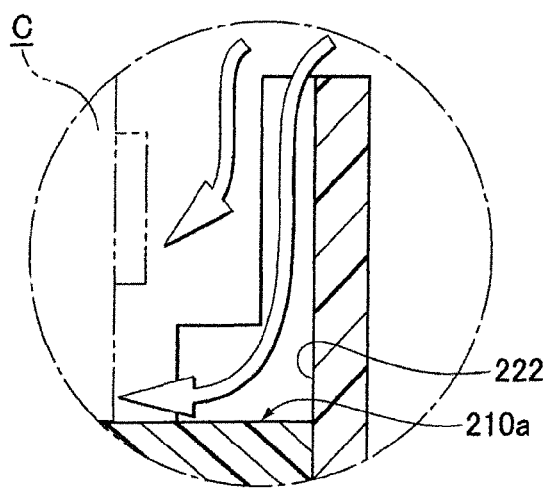
FIG. 10B is an enlarged view of a part of the synthetic resin shoe in FIG. 10A within a broken line circle labeled "10B"

As indicated by arrows in FIG. 10B, lubricating oil, present in the timing chain compartment in the form of a mist, accumulates in the indentations 222 and flows into the interface between the transmission chain and the sliding contact surface 210a of the shoe.

As shown at the left of FIG. 10A, the side wall 221 is thicker at the locations of parts 221a between the indentations. These thicker portions of the side wall 221 function as reinforcing ribs.

Sandwiching the shoe 210 between side walls 221 of the base on both sides of the shoe avoids a condition in which the chain rides over side walls of the guide. Moreover the side walls of the base, by virtue of their greater rigidity, are resistant to bending inward, which can impair stable chain travel.

Furthermore, with the configuration as shown in FIGS. 5-7, the fused area is increased, and consequently strength of the joint between the shoe and the base is increased. In addition, the side walls block widthwise movement of the shoe relative to the base. Accordingly, it is possible achieve a significant improvement in the strength of the joint between the shoe and the base, compared to the case of a conventional guide in which a back surface of a synthetic resin shoe is fused to a front supporting surface of a synthetic resin base.

In addition, the cooperation of the indentations 222 in side wall surface 221a with protrusions on the shoe enhances the strength of the bond between the shoe and the base. In addition, the indentations improved lubrication between the traveling chain and the shoe, suppressing thermal deterioration and wear of the shoe.

Figure 11:
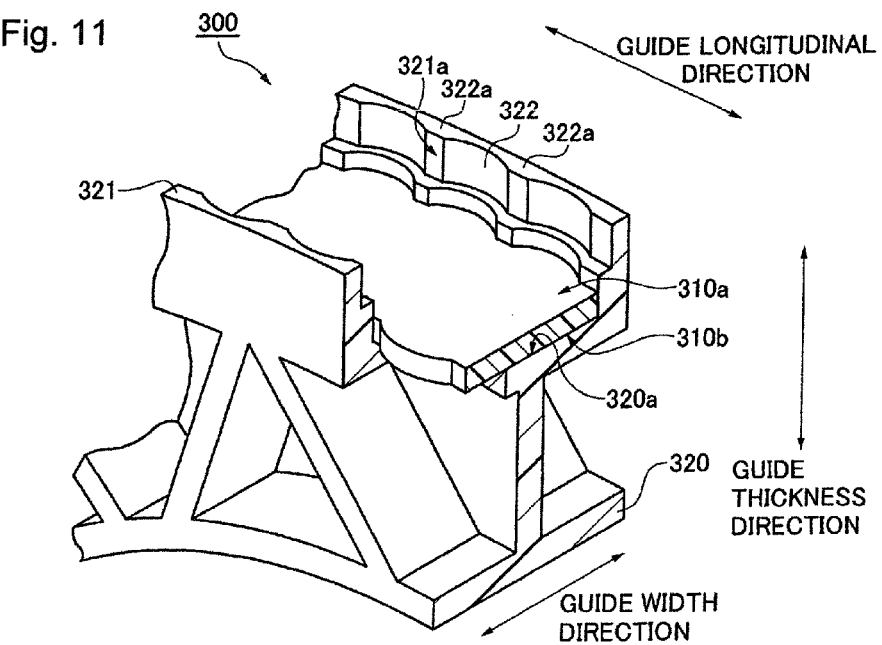
FIG. 11 is a fragmentary perspective view of a first modified version of the transmission guide of FIG. 5, partly in section.
Figure 12:
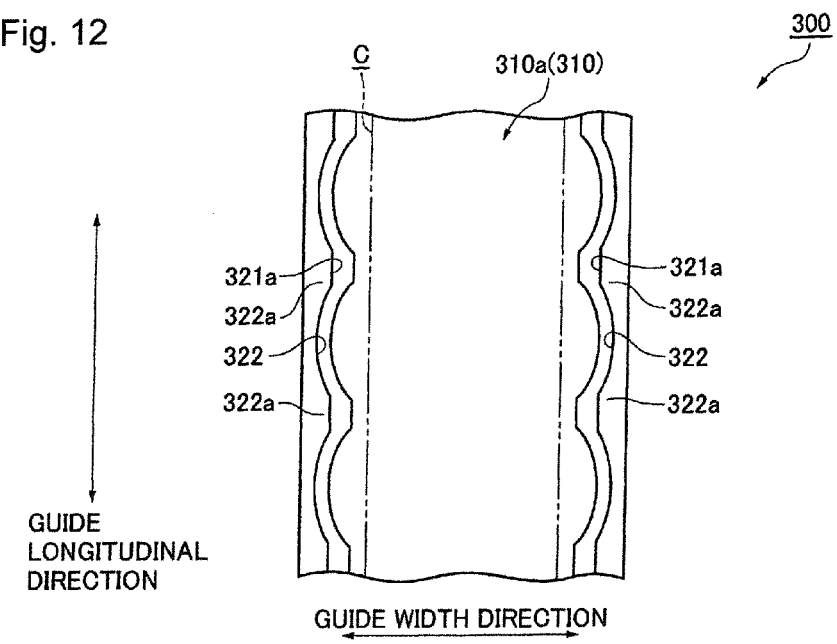
FIG. 12 is a plan view of a portion of the modified transmission guide of FIG. 11 as seen in the direction of the thickness of the shoe.

In the modified guide 300, shown in FIGS. 11 and 12, the parts and configuration are basically the same with those of the guide 200, except for the configuration of the side wall of the guide and the side edges of the shoe. Reference numbers in FIGS. 11 and 12 for parts corresponding to parts in FIGS. 6 and 7, exceed the reference numbers of the corresponding parts in FIGS. 6 and 7 by one hundred.

In FIGS. 11 and 12, each shoe engaging indentation 322 has a concave arcuate shape when viewed along the direction of the thickness of the shoe and the side wall is thinnest at the location of the deepest parts of the indentations, gradually becomes thicker toward the parts 322a between the indentations, which serve as reinforcing ribs.

The indentations 322 allow lubricating oil to be supplied to the sliding contact surface 310a of the shoe efficiently and effectively while achieving advantages similar to the advantages of the embodiment of FIGS. 5 and 6.

Figure 13:
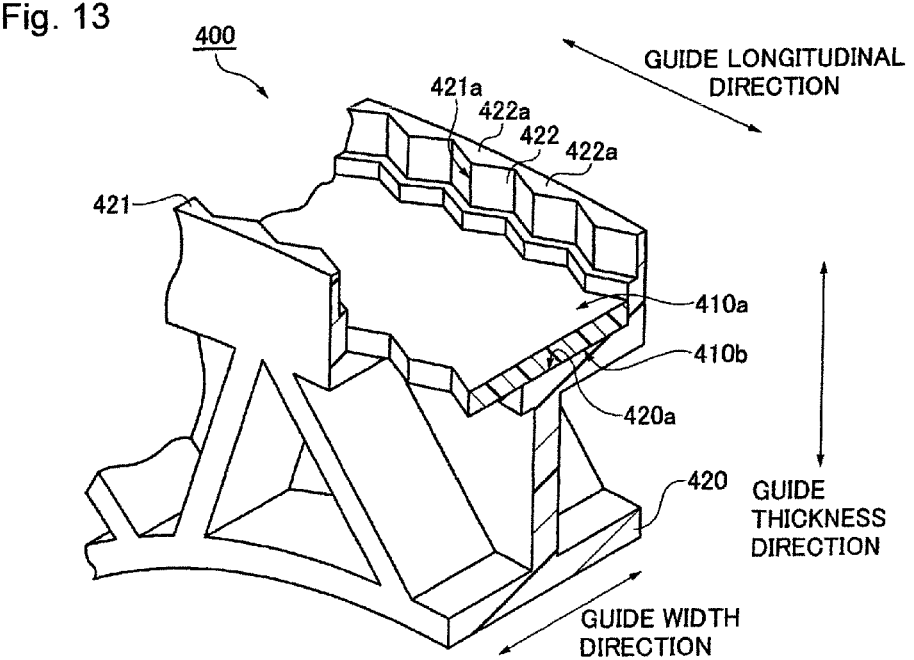
FIG. 13 is a fragmentary perspective view of a second modified version of the transmission guide of FIG. 5, partly in section.
Figure 14:
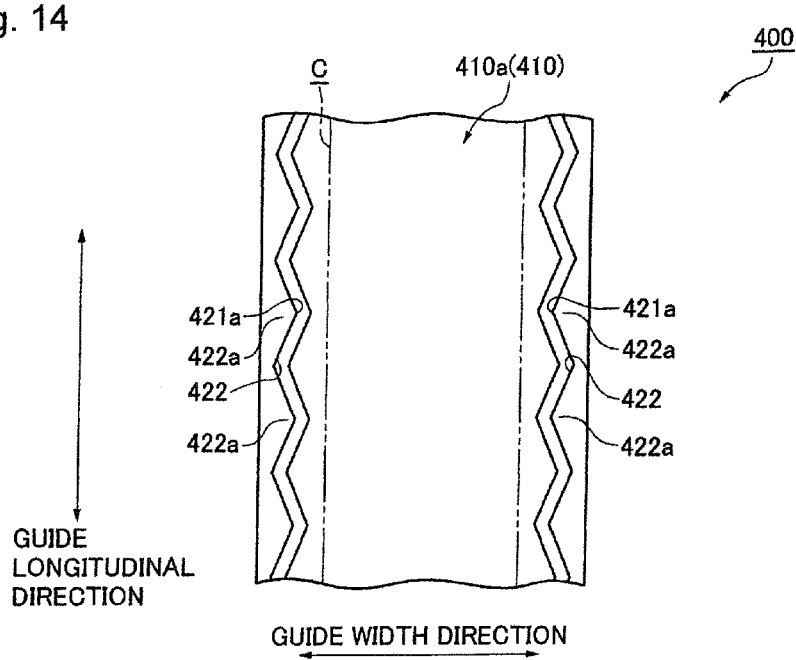
FIG. 14 is a plan view of a portion of the modified transmission guide of FIG. 13 as seen in the direction of the thickness of the shoe.

In the modified guide 400, shown in FIGS. 13 and 14, the parts and configuration are basically the same with those of the guide 200, except for the configuration of the side wall of the guide and the side edges of the shoe. Reference numbers in FIGS. 13 and 14 for parts corresponding to parts in FIGS. 6 and 7, exceed the reference numbers of the corresponding parts in FIGS. 6 and 7 by two hundred.

As shown in FIGS. 13 and 14, each shoe engaging indentation 422 has an obtuse-angle isosceles triangular shape when viewed along the direction of the thickness of the shoe and the side wall is thinnest at the location of the deepest parts of the indentations, gradually becomes thicker toward the parts 422a between the indentations, which serve as reinforcing ribs. Here, the inner part of the side wall surface, between the indentations, consists of narrow ridges 421a. The widths of the indentations, and their large number, allow lubricating oil to be supplied to the sliding contact surface 410a of the shoe efficiently and effectively, reducing wear and deterioration, and prolonging the useful life of the shoe.

Figure 15:
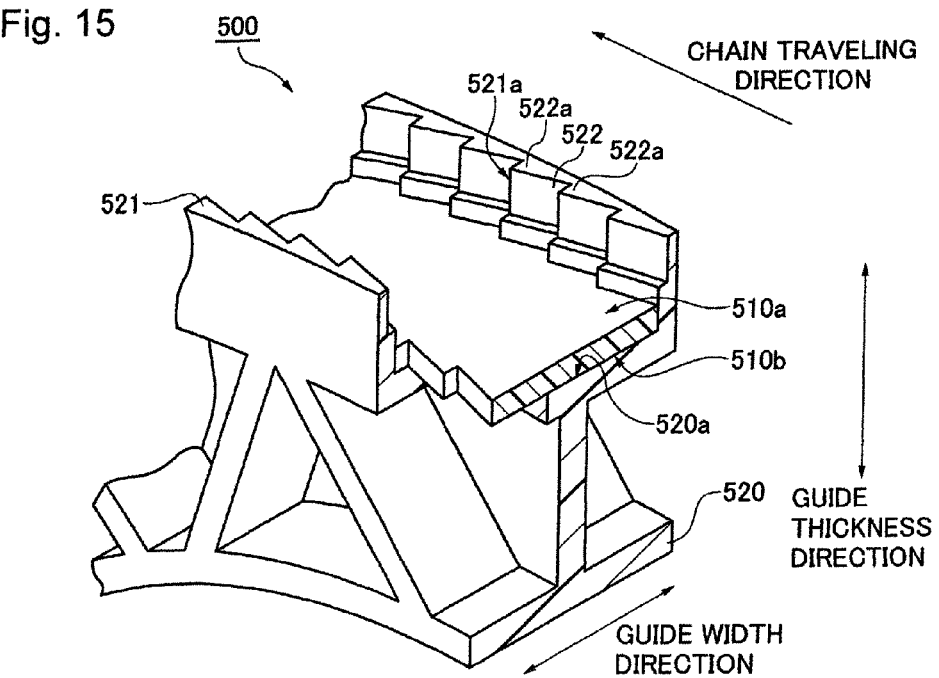
FIG. 15 is a fragmentary perspective view of a third modified version of the transmission guide of FIG. 5, partly in section.
Figure 16:
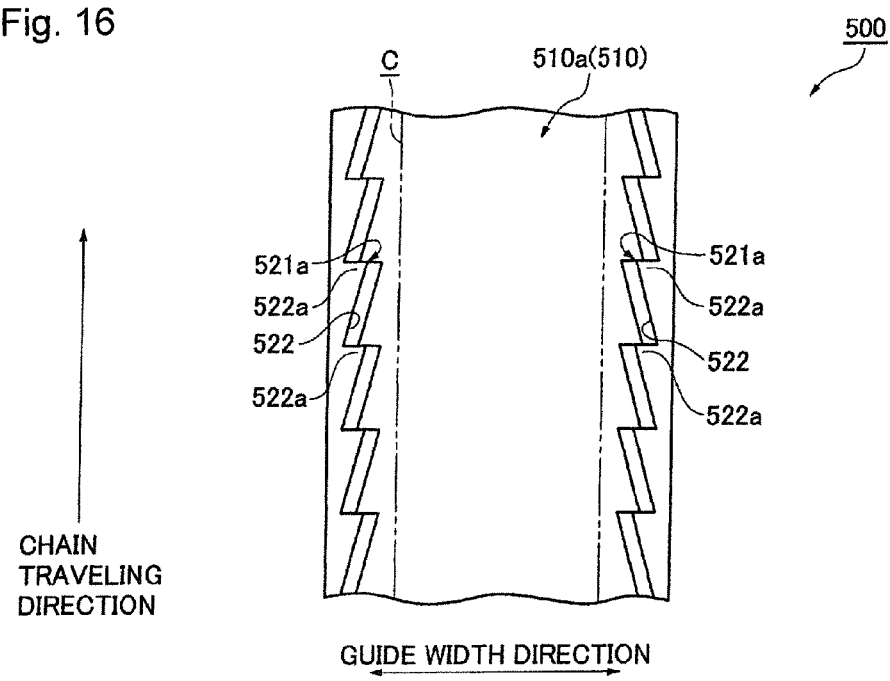
FIG. 16 is a plan view of a portion of the modified transmission guide of FIG. 15 as seen in the direction of the thickness of the shoe.

In the modified guide 500, shown in FIGS. 15 and 16, the parts and configuration are basically the same with those of the guide 200, except for the configuration of the side wall of the guide and the side edges of the shoe. Reference numbers in FIGS. 15 and 16 for parts corresponding to parts in FIGS. 6 and 7, exceed the reference numbers of the corresponding parts in FIGS. 6 and 7 by three hundred.

As shown in FIGS. 15 and 16, each shoe engaging indentation 522 has a right-triangular shape when viewed along the direction of the thickness of the shoe so that the thickness of the side wall gradually increases, proceeding longitudinally from the location of the deepest part of the indentation along the direction of chain travel toward the thickest parts 522*a* of the side wall.

Figure 17:
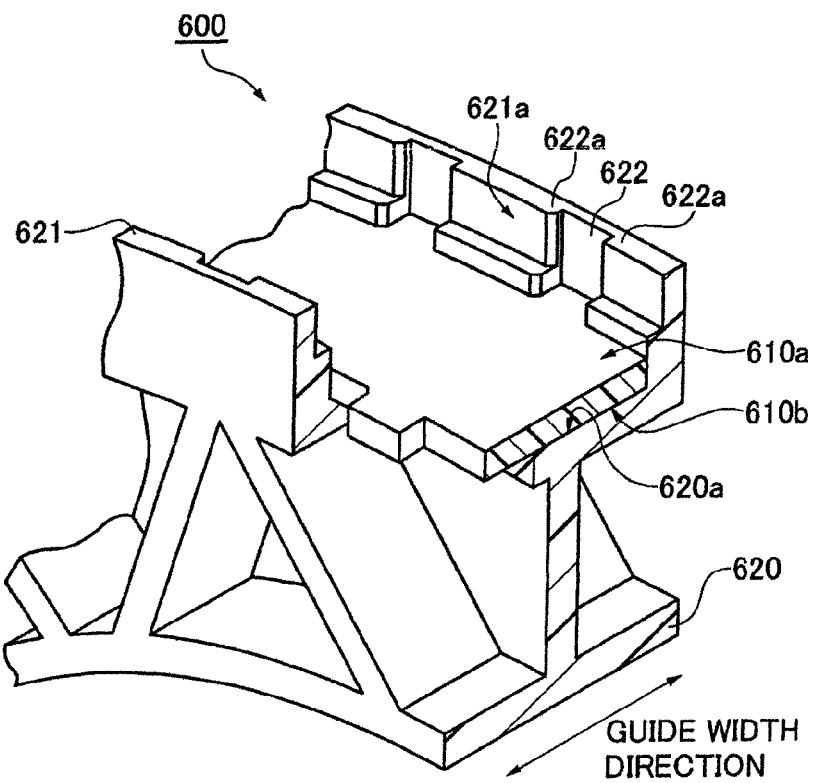
FIG. 17 is a fragmentary perspective view of a fourth modified version of the transmission guide of FIG. 5, partly in section.
Figure 18:
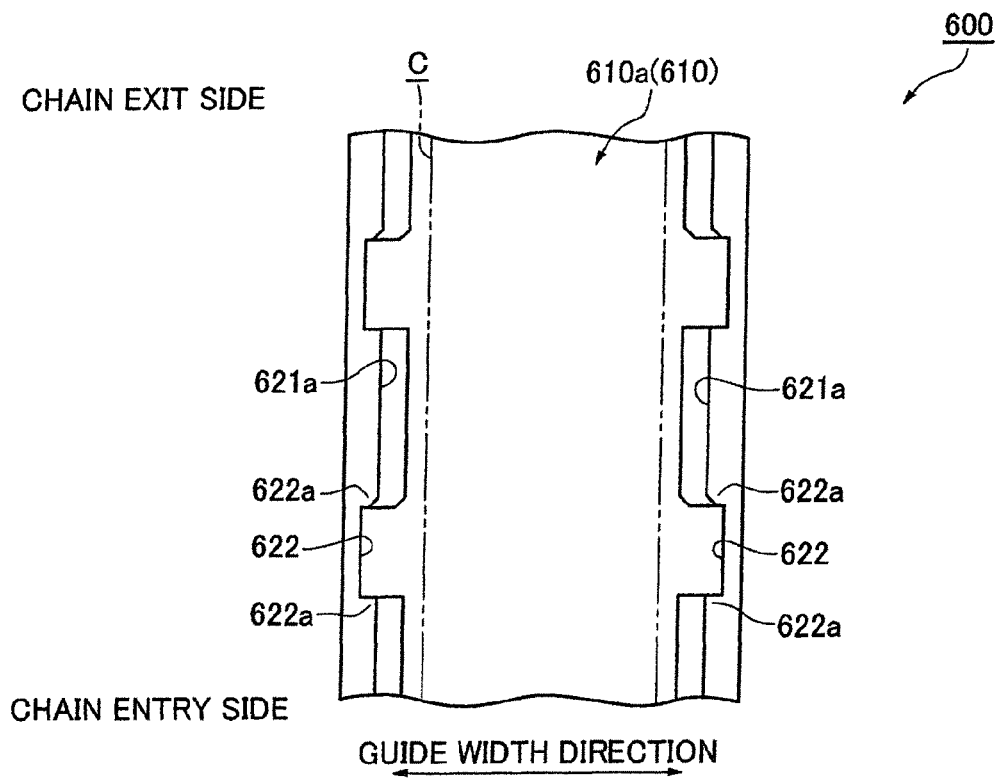
FIG. 18 is a plan view of a portion of the modified transmission guide of FIG. 17 as seen in the direction of the thickness of the shoe.

Here, as in the embodiment of FIGS. 13 and 14, the widths of the indentations, and their large number, allow lubricating oil to be supplied to the sliding contact surface 510*a* of the shoe efficiently and effectively, reducing wear and deterioration, and prolonging the useful life of the shoe In the modified guide 600, shown in FIGS. 17 and 18, the parts and configuration are basically the same with those of the guide 200, except for the configuration of the side wall of the guide and the side edges of the shoe. Reference numbers in FIGS. 17 and 18 for parts corresponding to parts in FIGS. 6 and 7, exceed the reference numbers of the corresponding parts in FIGS. 6 and 7 by four hundred.

As shown in FIGS. 17 and 18, the edge 622*a* of the opening of each indentation on the side of the indentation nearest the chain exit end of the guide is chamfered so that the opening of the indentation is tapered.

With this arrangement, even if the transmission chain meanders in the direction of the width of the guide, and contacts the indentation 622 the chamfered shape of the edge 622*a* of the opening prevents the indentation from interfering with travel of the transmission chain.

Figure 19:
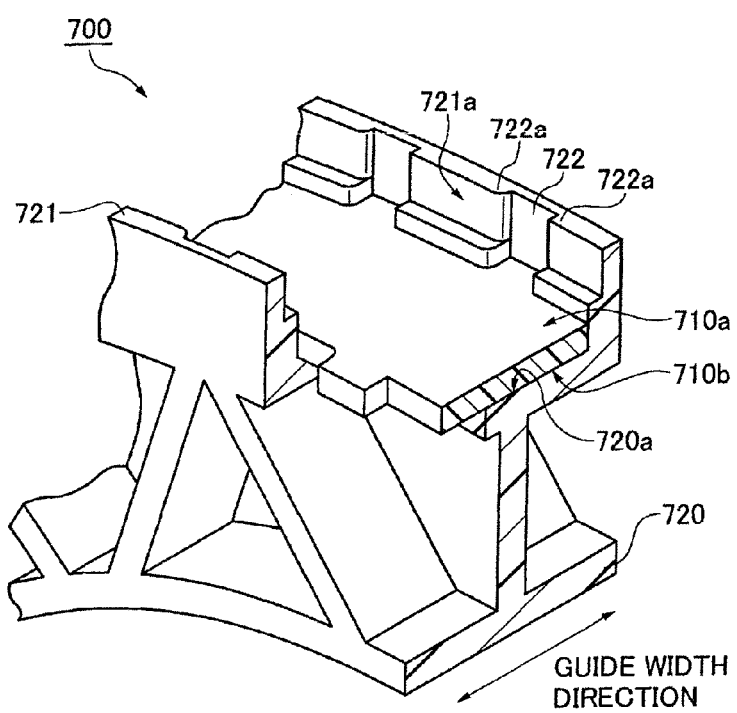
FIG. 19 is a fragmentary perspective view of a fifth modified version of the transmission guide of FIG. 5, partly in section.

In the modified guide 700, shown in FIGS. 19 and 12, the parts and configuration are basically the same with those of the guide 200, except for the configuration of the side wall of the guide and the side edges of the shoe. Reference numbers in FIGS. 19 and 20 for parts corresponding to parts in FIGS. 6 and 7, exceed the reference numbers of the corresponding parts in FIGS. 6 and 7 by five hundred.

Figure 20:
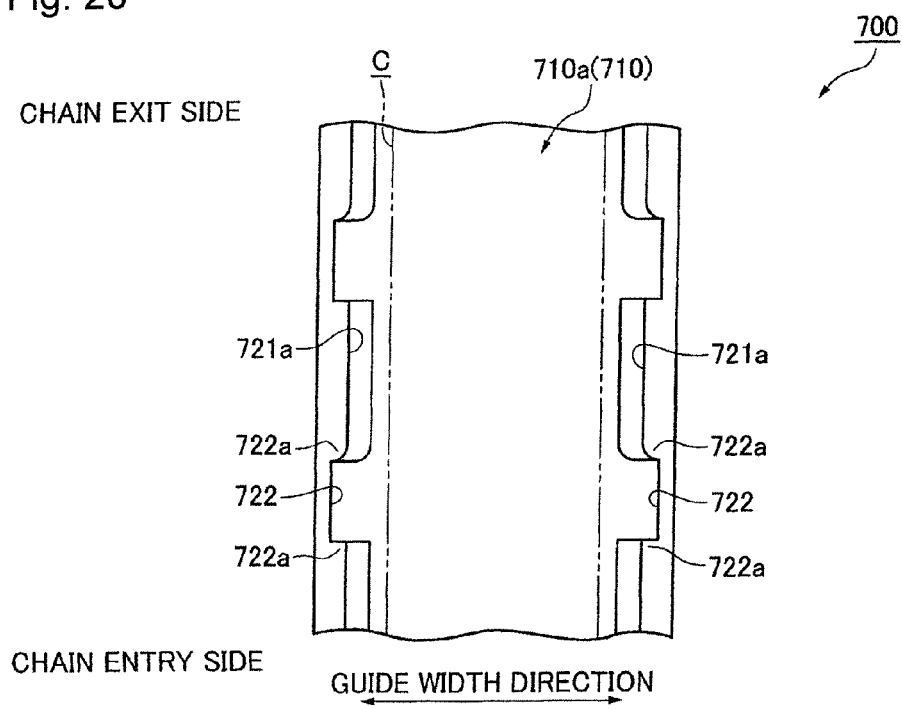
FIG. 20 is a plan view of a portion of the modified transmission guide of FIG. 19 as seen in the direction of the thickness of the shoe.
Figure 21:
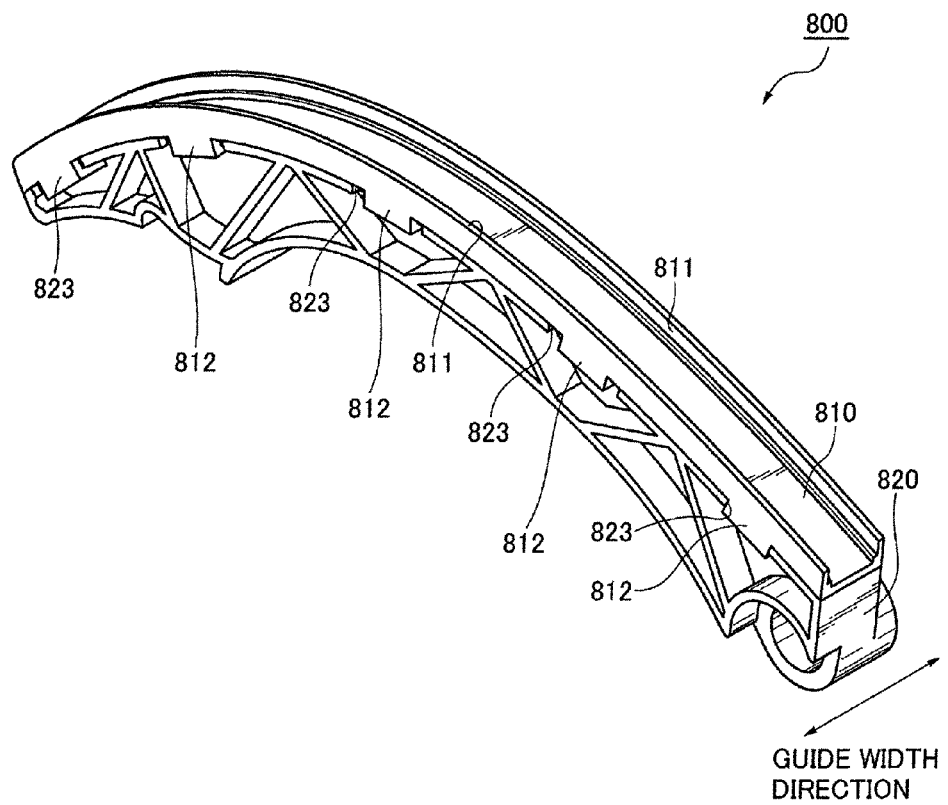
FIG. 21 is a perspective view of a prior art transmission guide.
Figure 22:
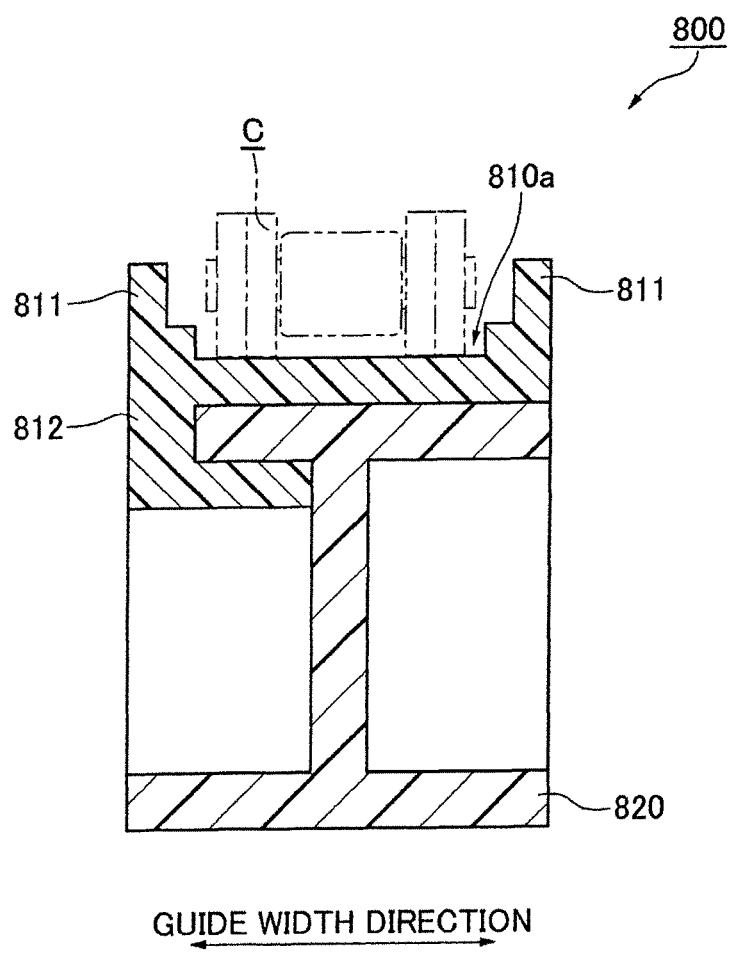
FIG. 22 is a cross-sectional view of the transmission guide shown in FIG. 21 taken on a section plane transverse to the direction of elongation of the guide.

As shown in FIGS. 19 and 20, the edge 822*a* of the opening of each indentation on the side of the indentation nearest the chain exit end of the guide is convexly curved, so that the opening of the indentation is tapered.

With this arrangement, even if the transmission chain meanders in the direction of the width of the guide, and contacts the indentation 722 the curved shape of the edge 722*a* of the opening prevents the indentation from interfering with travel of the transmission chain.

The two-member molding process for integrally molding the transmission guide of the invention can be ordinary two-member molding, "two-color" molding, or sandwich molding. In each case, primary injection molding is carried out using a primary cavity and a core to mold the synthetic resin base. Then by taking out the synthetic resin base from the primary cavity and mount it within a secondary cavity, secondary injection molding can be carried out to mold the synthetic resin shoe.

As an alternative, it is possible to implement molding of the synthetic resin shoe by carrying out primary injection molding of the shoe using a primary cavity and core, and then taking out the shoe from the primary cavity and mounting it within a secondary cavity wherein the base is formed by secondary injection molding.

It is also possible to form strips projecting from the supporting surface of the synthetic resin base, and extending parallel to the direction of elongation of the base, for engagement with grooves on the synthetic resin shoe.

The synthetic resin used for the transmission guide of the invention may be any of various synthetic resins, such as a polyamide or polybutylene terephthalate. A preferred material for the synthetic resin shoe having a sliding contact surface is polyamide 6 resin, polyamide 66 resin, polyamide 46 resin, as well as aromatic resins and other resins that exhibit self-lubricating properties. A preferred material for the synthetic resin base is a reinforced polyamide resin containing glass fibers.

Concerning the number of indentations on the guide base, preferably each side wall of the guide base has at least indentations on the chain entry side of a central indentation located approximately midway between the chain entry end and the chain exit end, and at least three indentations on chain exit side of the central indentation.

What is claimed is:

1. A transmission guide for sliding engagement with a traveling transmission chain, the guide comprising:
    a synthetic resin shoe having a front surface on which said chain can slide, and a back surface;
    a synthetic resin base for supporting said shoe, said base being elongated along the direction of elongation of the shoe, and having a supporting surface engaged with said back surface of the shoe, the base having a higher rigidity than that of the synthetic resin shoe, and said shoe and base being integrally molded by two member molding;
    wherein the synthetic resin base is provided with a pair of spaced, opposed walls extending along the direction of elongation of the base, that sandwich both sides of at least a portion of the synthetic resin shoe located between said walls;
    wherein each of said walls of the synthetic resin base has a wall surface that extends along the direction of elongation of the shoe, and a plurality of shoe-engaging concave indentations in said wall surface, disposed at intervals along the direction of elongation of the shoe, and in which the shoe has a plurality of protrusions on each of its side edges, each of said protrusions extending into one of said indentations; and
    wherein each of said indentations has an opening through which a protrusion of the shoe extends, said opening being defined by a pair of edges spaced from each other in the direction of elongation of the shoe and extending substantially perpendicular to an adjacent part of said supporting surface of the base, and wherein at least one of the edges of each said pair of edges has a shape from the group consisting of chamfers and convex curves whereby the opening of each indentation is tapered.

2. A transmission guide for sliding engagement with a traveling transmission chain, the guide comprising:
    an elongated synthetic resin shoe having a front surface on which said chain can slide, a back surface, and opposite side edges extending along the direction of elongation of the shoe; and
    a synthetic resin base for supporting said shoe, said base being elongated along the direction of elongation of the shoe, and having a supporting surface engaged with said back surface of the shoe, said supporting surface having opposite edges extending along the direction of elongation of the base, the base having a higher rigidity than that of the synthetic resin shoe, and said shoe and base being integrally molded by two member molding;

wherein the synthetic resin base is formed with a pair of spaced, opposed, side walls extending in the direction of elongation of the base along said opposite edges of said supporting surface, said side walls engaging the respective side edges of the shoe and extending past said front surface of the shoe whereby said side walls of the base can restrict lateral movement of a transmission chain sliding along the front surface of the shoe; and wherein each of said side walls of the synthetic resin base has a side wall surface that extends along the direction of elongation of the shoe, and a plurality of shoe-engaging concave indentations in said side wall surface, disposed at intervals along the direction of elongation of the shoe, and in which the shoe has a plurality of protrusions on each of its side edges, each of said protrusions extending into one of said indentations.

3. The transmission guide according to claim 2, wherein each of said indentations has an opening through which a protrusion of the shoe extends, said opening being defined by a pair of edges spaced from each other in the direction of elongation of the shoe and extending substantially perpendicular to an adjacent part of said supporting surface of the base, and wherein at least one of the edges of each said pair of edges has a shape from the group consisting of chamfers and convex curves whereby the opening of each indentation is tapered.

* * * * *